(12) United States Patent
Buchner

(10) Patent No.: US 6,839,722 B2
(45) Date of Patent: Jan. 4, 2005

(54) METHOD FOR REFERENCING TIME-RELATED ENTRIES IN DIFFERENT FILES IN A PLANNING PROGRAM

(75) Inventor: Klaus Buchner, Kleinsendelbach (DE)

(73) Assignee: Siemens Aktiengesellschaft, München (DE)

( * ) Notice: Subject to any disclaimer, the term of this patent is extended or adjusted under 35 U.S.C. 154(b) by 399 days.

(21) Appl. No.: 09/982,054

(22) Filed: Oct. 17, 2001

(65) Prior Publication Data

US 2002/0073100 A1 Jun. 13, 2002

(30) Foreign Application Priority Data

Oct. 17, 2000 (DE) .......................................... 100 51 456

(51) Int. Cl.[7] .............................................. G06F 17/00
(52) U.S. Cl. ........................ 707/200; 707/101; 707/102
(58) Field of Search .................. 700/97–102; 707/1–10, 707/200–206, 100–104.1

(56) References Cited

U.S. PATENT DOCUMENTS

| | | | | |
|---|---|---|---|---|
| 6,445,968 B1 | * | 9/2002 | Jalla ........................... | 700/101 |
| 6,496,747 B1 | * | 12/2002 | Suzuki ........................ | 707/203 |
| 6,725,211 B1 | * | 4/2004 | Ashton et al. .................. | 707/2 |
| 6,732,103 B1 | * | 5/2004 | Strick et al. ................... | 707/10 |

FOREIGN PATENT DOCUMENTS

| | | |
|---|---|---|
| DE | 38 12 101 A1 | 11/1989 |
| DE | 196 45 654 A1 | 5/1998 |
| DE | 199 11 699 A1 | 9/2000 |

OTHER PUBLICATIONS www.google.com cache of xnet.rrc.mb.ca/glennd/Integration%20Methods/SlidesII/ch05.ppt, copyright 1999.* www.macworld.com/1999/02/reviews/chart.*

Listing of Proceedings, Fifth International WOrkshop on Temporal Representation and Reasoning, May 16–17, 1998.*

Kapur et al., Modelling an imperfect debugging phenomenom with testing effort, Software Reliability Engineering, 1994, Proceedings, 5th International Symposium, pp. 178–183.*

Barnes, QualiTROL SENTRY transformer monitoring system, Monitors and Condition Assessmenht Equipment, IEE Colloquium on, Dec. 5, 1996, pp. 2/1–2/7.*

* cited by examiner

Primary Examiner—David Jung
(74) Attorney, Agent, or Firm—Schiff Hardin LLP

(57) ABSTRACT

A method for referencing time-related entries in different files in a planning program for project planning, and for determining and optically reproducing any time delays in the project implementation, with one or more nominal planning entries, which define times or time intervals, being entered in a reference file, until which or within which one or more individual projects are intended to be implemented, with actual entries, which are a measure of the time evolution of the respective individual project implementation, being entered in one or more further individual-project-related files, with the nominal planning entries being used as time reference data, with respect to which the actual entries of one or more individual projects are referenced, and with a time overrun which results or can be predicted on the basis of the actual entries in comparison with the nominal planning entries, of the respective reference nominal planning entry being determined by computation and being reproduced on a display device.

16 Claims, 3 Drawing Sheets

METHOD FOR REFERENCING TIME-RELATED ENTRIES IN DIFFERENT FILES IN A PLANNING PROGRAM

BACKGROUND OF THE INVENTION

1. Field of the Invention

The present invention relates to a method for referencing plan-related entries in different files in a planning program for project planning, and for determining and optically reproducing any time delays in the project implementation.

2. Description of the Related Art

The timing or the presetting of a nominal schedule for a project of greater or lesser size, possibly comprising a large number of individual projects, requires considerable planning effort. Such plans are produced in widely differing fields, for example for building construction, for the production of industrial plants or machines, etc. It is invariably necessary to coordinate individual time schedules with one another, and to produce a higher-level nominal plan. Suitable software programs are being increasingly used for this purpose, and these allow planning to be carried out on a computer facility. One frequently used program is the planning program known by the trade name "Microsoft Project".

This program is used to plan the entire project and various individual projects on the basis of separate files, in which case the individual plans can to this extent also be "processed" and this can also be recorded, for which purpose, for example, the weekly or monthly working hours carried out on an individual project are entered. However, this does not provide the planner with any control whatsoever as to the extent to which the schedule which he has predetermined in the nominal plan can be kept to at all, that is to say whether the various individual projects, whose implementation is mutually independent, can be started, and also completed, at the required times. It is thus impossible for the planner to quickly produce any desired overview of the status quo and to identify any implementation delays, irrespective of whether these have occurred or can be predicted. However, this would be important since, if early knowledge of any delay that has occurred or is possible is available, it is still possible to take measures in order to compensate, or to minimize this delay, which intrinsically leads to considerable damage.

A method for monitoring, controlling and/or optimizing of process and/or task project plans is known from the German Patent document DE 199 11 699 A1. In this method, the actual state is determined on the basis of already recorded process and/or task project plans, and a nominal process and/or nominal task project plan is likewise recorded. A modified process and/or task plan is then produced by the program. However, this method does not make it possible to display discrepancies or delays in a simple manner.

A method for commercial control of locally organized financial units is proposed in German Patent Document DE 196 45 654 A1. This provides for nominal planning entries and actual entries to be displayed at the same time. However, this has the disadvantage that problems such as time overruns cannot be seen directly.

A test set for a number of measurement points is known from German Patent Document DE 38 12 101 A1. The test set has means for setting a nominal value and a comparative display for the nominal value and the measured actual value.

SUMMARY OF THE INVENTION

The present invention is thus based on the problem of providing a computer-aided method which allows any time conflicts in the course of project implementation to be recorded and displayed in a simple manner.

This problem is solved by a method for referencing time-related entries in different files in a planning program for project planning, and for determining and optically reproducing, or displaying, any time delays in the project implementation, with one or more nominal planning entries, which define times or time intervals, being entered in a reference file, until which or within which one or more individual projects are intended to be implemented, with actual entries, which are a measure of the time evolution of the respective individual project implementation, being entered in one or more further individual-project-related files, with the nominal planning entries being used as time reference data, with respect to which the actual entries are referenced, and with a time overrun which results or can be predicted on the basis of the actual entries in comparison with the nominal planning entries, of the respective reference nominal planning entry being determined by computation and being reproduced on a display device.

The method according to the invention is distinguished in that a check can be carried out at any given time or at any given implementation stage to determine whether one or more individual projects is or are still "on time" or whether delays have already occurred or are probable. To do this, the actual entries for one or more individual projects in the reference are referred to a specific nominal planning entry in a reference file, with any overrun being determined on the basis of this reference or this time association. This may be an overrun that has already occurred, or such an overrun may equally well also be predictable, if this can be clearly assessed on the basis of the actual entries and the nominal planning entry. In any case, any time conflict is indicated visually on a display device to the planner who is carrying out the check or the referencing so that he is immediately made aware of the potential conflict, and can take appropriate measures.

There is advantageously no longer any need for complex searching for any time conflicts by a tedious comparison process that must be carried out by the planner himself. In fact, the recording of the relevant entries, the comparison to carry out the referencing process and the determination of any time overruns as well as outputting on the display device by means of a computer in which the appropriate task software is stored and which is designed to carry out the method and to process the software is carried out automatically or by a check controlled by the user.

In a development of the idea of the invention, it is possible for the time overrun to be reproduced as a colored marking in the reference file displayed as a graphic on a screen, and/or in the individual-project-related file or files on the screen. On viewing the respective file that is displayed in the form of a graphic on the screen, the planner thus immediately sees whether there is any need to be concerned about a time conflict within the respective referenced files. In this case, the reference file and/or the individual-project-related files can be displayed on the screen in the form of dot diagrams and/or bar charts, in which the time overrun is reproduced as an elongated bar. Alternatively or additionally, the time overrun may also be reproduced as a numerical value in the reference file displayed as a table on a screen, and/or in the individual-project-related file or files displayed on the screen. The user expediently has the choice of the display form which he prefers.

In order to improve the flexibility of the method even further and to provide the user with even more selection options for referencing, and to refine even further the capability to identify any time conflicts, the invention can furthermore provide an individual project comprises a number of subprojects, for each of which actual entries are recorded, with the individual project being considered in its totality, that is to say the timing of all the subprojects can be considered jointly, in the course of the referencing process, or with the capability to reference each subproject itself. The user can thus reference the individual project in its totality if he is interested only in determining whether there are any time conflicts overall with regard to that individual project or, alternatively, he can also check a reference for each subproject to the reference data item he has preset. The entire project is thus extremely transparent to the planner himself.

In a development of the idea of the invention, time values are entered as actual entries, which indicate the work carried out for an individual project, and possibly for a subproject, by at least one person who is working on that project on a daily, weekly or monthly basis, with the time values between the time of the start of the project and the last actual entry being determined for referencing, and a calculation being carried out to determine whether the reference nominal planning entry has been overrun, has probably been overrun or has not been overrun, with a given or probable overrun being reproduced. According to this refinement of the invention the working time that has actually taken place is thus taken into account in the course of the referencing process. If it is found that too little effort has been applied to the project, an overrun is thus possible since the fact that too little work has been carried out means that it must be expected that an individual project or subproject will not be completed on time.

In this case, in order to determine an overrun, the actual entries are compared with daily, weekly or monthly preset actual entries for the respective individual project, or possibly subproject, with an overrun that has occurred or a probable overrun being calculated on the basis of the difference between the preset actual entries and the associated actual entries. According to this refinement of the invention, the planning or implementation manager who is responsible for the individual project defines time preset actual entries, that indicate how many hours per week a person must work on that particular project. The person in turn enters the working hours he has carried out as actual entries. If there is a difference here between the preset and the actual work carried out, then this difference may form the basis for a possible subsequent delay. In this case, it can be provided for each time difference resulting from the comparison to be applied to the most recent preset actual entry, with the time value resulting from this being compared with the nominal planning entry in order to determine any overrun. If there is any time difference in the first month in which work is carried out on the project, then this shortage of working time must be recovered later in order to achieve the project. In this refinement of the invention, this is recorded by the most recent preset actual entry automatically having the time difference added to it by the computer, with this increased value being compared with the nominal planning entry, which defines a time by which the respective project should be complete, to allow any overrun to be determined, specifically when the working time to be carried out in the most recent planned working time interval (week or month or the like) is too long and, in consequence, the work on the projects cannot be completed in time.

Finally, the invention provides that it is possible to select at the user end which individual project, and possibly which subproject, is to be referenced with respect to which nominal planning entry, so that the user can check any desired time relationships.

In addition to the method according to the invention, the invention also relates to a computer program having program code means in order to carry out all the steps in the method described above when the program is run on a computer.

Finally, the invention relates to a computer program having program code means as described above, which is stored on a computer-legible data storage medium.

BRIEF DESCRIPTION OF THE DRAWINGS

Further advantages, features and details of the invention can be found from the Exemplary embodiments described in the following text and from the drawings, in which.

DETAILED DESCRIPTION OF THE PREFERRED EMBODIMENTS

Figure 1:
FIG. 1 shows an outline sketch to illustrate the referencing process according to the invention and how any time overruns are indicated.
Figure 1:
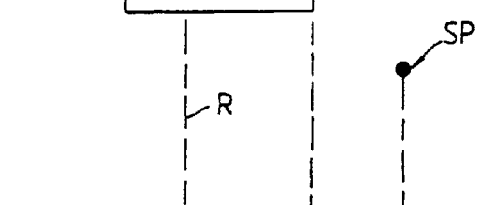
Figure 1:
Figure 1:
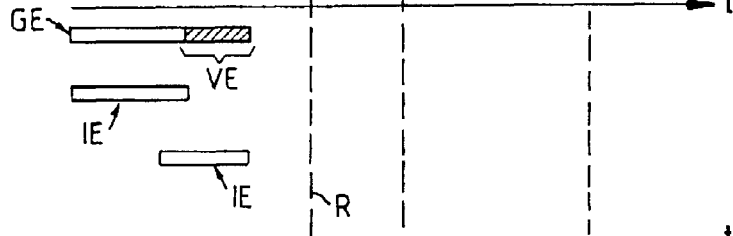
Figure 1:
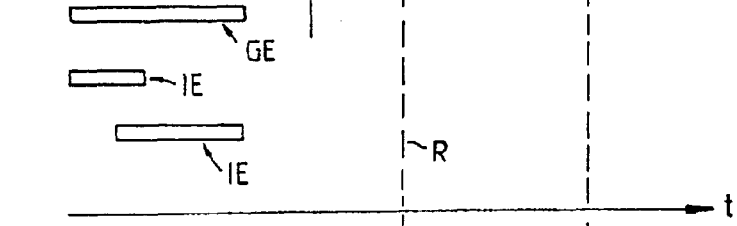
Figure 1:
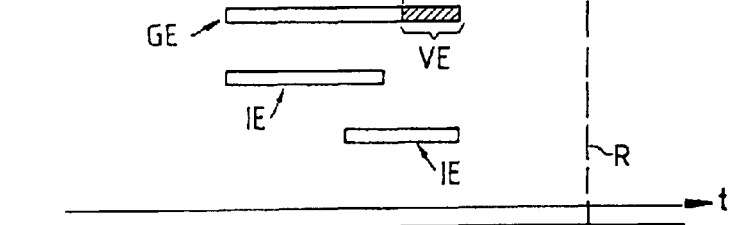
Figure 1:
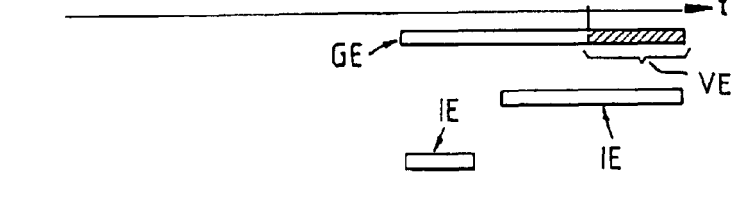

In the form of an outline sketch, FIG. 1 shows a referencing scheme according to the invention and the capability to display any time conflicts found. The illustration shown in FIG. 1 is reproduced to the user on a screen, assuming he has selected this type of display and assuming that he wishes to display and reference the projects 1–4 shown in the illustrated example.

This is based on a "reference" reference file which contains a total of four entries, namely project 1, project 2, project 3 and project 4. A nominal planning entry SP is entered for each of these projects with respect to a time axis t, which is indicated in individual weeks or months. This may be in the form of a specific time, displayed by entries in the form of dots, or in the form of a time interval, as indicated by the bar. Each of the nominal planning entries indicates the time by when or the time interval within which the associated project is intended to be completed.

Furthermore, the individual files for the respective projects 1–4 are indicated. In the illustrated exemplary embodiment, each project 1–4 comprises two subprojects 1a, 1b, . . . 4a, 4b. An actual entry IE is entered for each of these subprojects and indicates the length of time for which work has already been carried out on a subproject. These entries which are also displayed in the form of the bars here and are obtained, for example, from working hours carried out and entered in a time recording file associated with the respective individual project, are plotted with respect to a time axis t, which is identical to the reference file. The further upper bar GE which is provided in each project 1–4 represents the overall entry and indicates how long work has already been carried out for since the start of the project prior to the most recent entry. It thus represents the total of the lengths of the individual bars IE.

As shown in FIG. 1, the project 1 is referenced to the entry "project 1" in the reference file in the illustrated example, as is shown by the dashed line R. As can be seen, the overall working time on project 1 overruns the time defined for the project 1 by means of the nominal planning entry SP. This means that an overrun has occurred. The overrun is indicated by the elongated bar VE, for example as a colored marking. The planner can thus immediately see that there is a delay in the project 1.

The situation for project 2 is different. There, the actual entries IE have resulted in an overall entry bar GE which ends at a time which is still considerably before the end of the end time defined by the nominal planning entry SP for the project 2. The referencing line R shows that there is not yet any overrun here.

In contrast, there are time overruns in projects 3 and 4. In the illustrated example, the subproject 3b has not been completed on time, thus resulting in the delay. In the case of the project 4, the work on subproject 4a has not yet been completed, which leads to delays here. In this case as well, the time overruns are each indicated by the elongated bars VE for the overall entry bar GE.

If the planner now selects all the projects 1–4, and possibly the reference file as well, to be displayed on the screen, he is immediately provided with information as to which project has been delayed.

Figure 2:
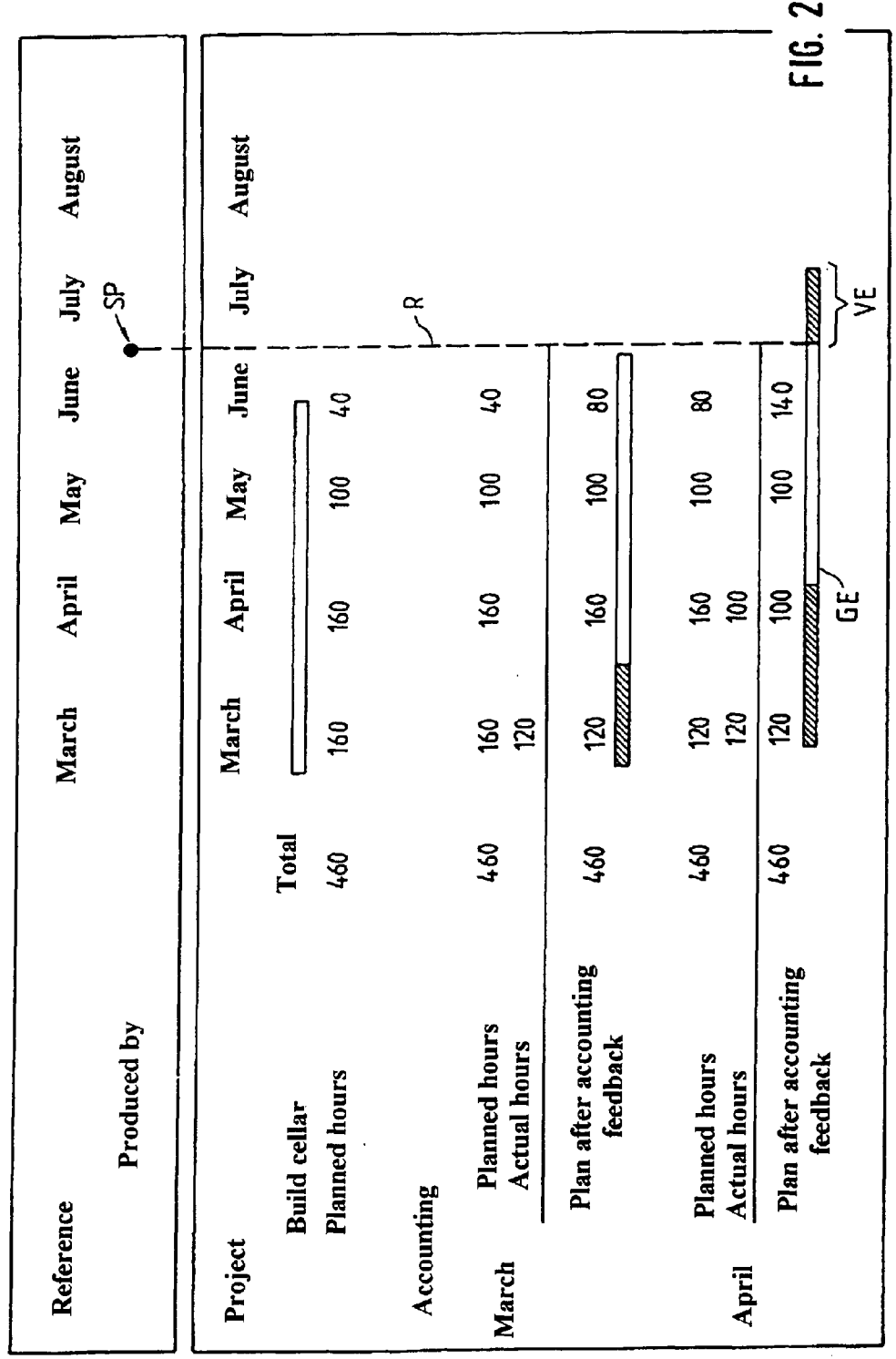
FIG. 2 shows an illustration of the referencing and determination of a time overrun on the basis of working hours carried out.

FIG. 2 shows in detail the method sequence on which the determination of the overrun that can be predicted is based.

The upper box shows the reference files. In the illustrated example, the plan relates to the completion of a cellar. In this context, a nominal planning entry SP relating to the "cellar completion" work is entered along the time axis for the start of July.

The project file is entered underneath, for example representing the building plan. The entire "build cellar" project is represented by the total bar. This starts at the beginning of March, and ends in mid-June. The planned monthly working hours to be carried out are entered underneath. 160 hours must be worked in March, 160 in April, 100 in May and 40 hours in June, before the cellar is completely built. Overall, this results in a total of 460 working hours. The planned hours represent preset actual entries. If these hours were worked, the cellar would be completed on time.

In the "accounting" section underneath this the hours planned for the respective months of March and April are compared with the hours carried out. In March a total of 120 hours were carried out, and there is thus a time difference of 40 hours from the preset actual entry of 160 hours. This time difference is added to the amount of work in the month of June, thus resulting in the working hours to be carried out in June being increased from 40 to 80.

Instead of the planned 160 hours, only 100 hours were worked in April. The time difference of 60 hours resulting from this is once again added to the month of June, so that a total of 140 hours must be worked. As a result of this increase in the amount of work to be carried out in the month of June, the cellar construction will necessarily be delayed beyond the reference time at the start of July. The delay resulting from this is determined by calculation, and a delay can thus be predicted, since this has a relatively high predicted probability. This is indicated to the planner by the elongated entry VE.

Figure 3:
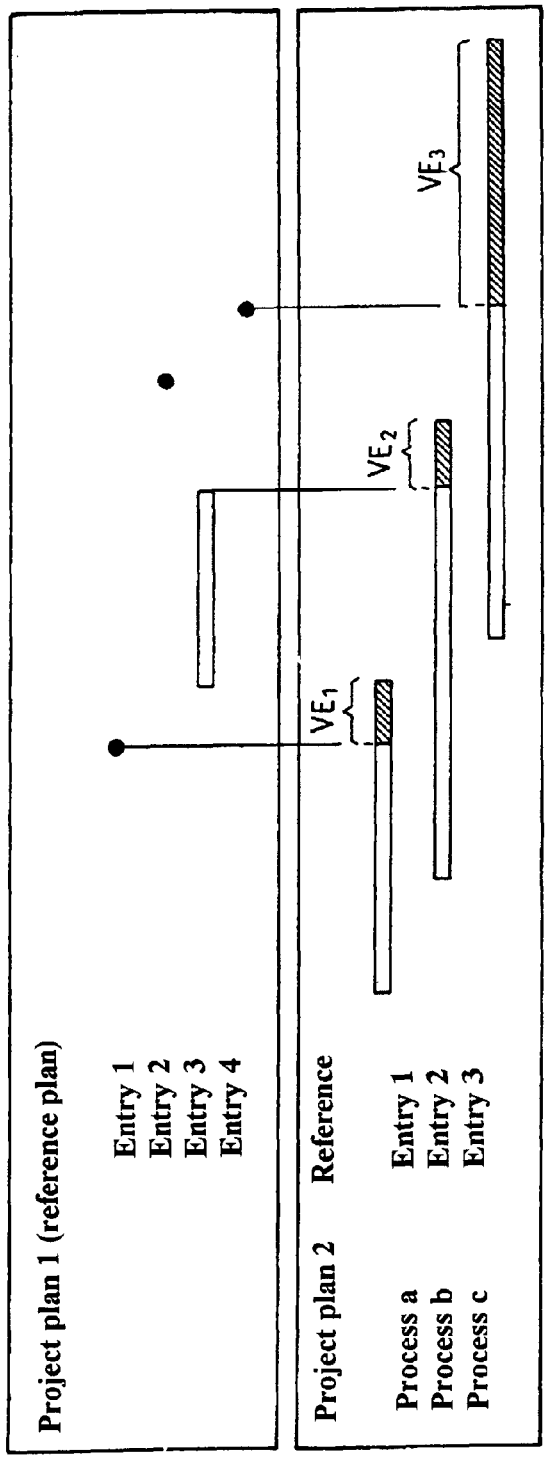
FIG. 3 shows an illustration of the display option for referencing in the form of a bar chart, and in tabular form.

Finally, FIG. 3 once again uses an outline sketch to show the capability to reference two plans in the form of a bar chart and in tabular form, with the overruns or delays in each case being indicated in an appropriate manner. In tabular form, the delays are preferably shown in the form of days or weeks, or possibly months as well, and possibly also with a specific end date that can be predicted being stated.

Although other modifications and changes may be suggested by those skilled in the art, it is the intention of the inventors to embody within the patent warranted hereon all changes and modifications as reasonably and properly comes within the scope of their contribution to the art.

I claim:

1. A method for referencing time-related entries in different files in a planning program for project planning, comprising:

defining times or time intervals until which or within which at least one project is intended to be implemented;

entering said times or time intervals in a reference file as nominal planning entries for said at least one project;

entering actual times or time intervals in at least one further project related file, said actual times or time intervals being a measure of actual times of individual project implementations of said at least one project;

using said nominal planning entries as time reference data, said time reference data being referenced to said actual times or time intervals;

determining by computation an actual or predicted time overrun by comparing said actual entries with respective ones of said nominal planning entries; and displaying said time overrun on a display device so as to determine and optically reproduce any time delays in the project implementation.

2. A method as claimed in claim 1, wherein said step of displaying displays a colored marking in a reference file as a graphic.

3. A method as claimed in claim 1, wherein said step of displaying displays at least one individual-project-related file on a screen of said display device.

4. A method as claimed in claim 1, wherein said step of displaying displays said reference file or individual-project-related files on a screen as at least one of dot diagrams and bar charts in which said time overrun is reproduced as an elongated bar.

5. A method as claimed in claim 1, wherein said step of displaying reproduces said time overrun as a numerical file in the reference file which is displayed on a screen as a table.

6. A method as claimed in claim 1, wherein said project includes a plurality of sub-projects, and further comprising the steps of:

recording actual entries for each of said sub-projects;

considering said project in its totality during referencing to said time reference data.

7. A method as claimed in claim 1, wherein said project includes a plurality of sub-projects, and further comprising the steps of:

recording actual entries for each of said sub-projects;

considering each of said sub-projects individually during referencing to said time reference data.

8. A method as claimed in claim 1, wherein said actual entries are time values which indicate work carried out for an individual project by at least one person who is working on that project, wherein said actual times are time values between a time of a start of the project and a last actual entry, wherein said determining step calculating whether the nominal planning entry has been overrun, has probably been overrun or has not been overrun, and wherein said displaying step displaying an actual or probable overrun.

9. A method as claimed in claim 8, wherein said actual entries are time values for a sub-project.

10. A method as claimed in claim 8, wherein said determining step compares the actual entries with preset actual entries entered for the respective individual project, wherein said determining step calculating an actual or probable overrun on a basis of a difference between the preset actual entries and the associated actual entries.

11. A method as claimed in claim 10, further comprising the steps of:

applying any time difference resulting from the comparison to a most recent preset actual entry; and comparing the time value resulting from said applying step with the nominal planning entry in order to determine any overrun.

12. A method as claimed in claim 1, further comprising the step of:

accepting a selection at a user end as to which individual project is to be referenced with respect to which nominal planning entry.

13. A method as claimed in claim 12, wherein said accepting step includes accepting a selection as to which sub-project is to be referenced.

14. A computer program having program code to carry out on a computer the steps of:

defining times or time intervals until which or within which at least one project is intended to be implemented;

entering said times or time intervals in a reference file as nominal planning entries for said at least one project;

entering actual times or time intervals in at least one further project related file, said actual times or time intervals being a measure of actual times of individual project implementations of said at least one project;

using said nominal planning entries as time reference data, said time reference data being referenced to said actual times or time intervals;

determining by computation an actual or predicted time overrun by comparing said actual entries with respective ones of said nominal planning entries; and displaying said time overrun on a display device so as to determine and optically reproduce any time delays in the project implementation.

15. A computer program as claimed in claim 14, further comprising the step of:

storing program code to carry out said steps on a computer legible data storage medium.

16. A method for determining a time overrun in a project, comprising the steps of:

entering projected time intervals into a reference file of a project planing program as nominal planning data;

entering actual time intervals of a project implementation into a further file of said project planning program;

comparing said projected time intervals to said actual time intervals;

determining by computation an actual or predicted time overrun if at least one of said actual time intervals exceeds a corresponding one of said projected time intervals; and displaying said actual or predicted time overrun on a display device.

* * * * *